United States Patent
Kim et al.

(10) Patent No.: US 10,938,323 B2
(45) Date of Patent: Mar. 2, 2021

(54) ENERGY GENERATING SYSTEM WITH INTEGRATED ENERGY GENERATOR AND ENERGY STORAGE

(71) Applicant: Research & Business Foundation Sungkyunkwan University, Suwon-si (KR)

(72) Inventors: SangWoo Kim, Yongin-si (KR); JiHye Kim, Suwon-si (KR); HanJun Ryu, Suwon-si (KR); SungSoo Kwak, Suwon-si (KR); HongJoon Yoon, Goyang-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 32 days.

(21) Appl. No.: 16/358,872

(22) Filed: Mar. 20, 2019

(65) Prior Publication Data
US 2019/0312529 A1   Oct. 10, 2019

(30) Foreign Application Priority Data
Apr. 4, 2018   (KR) .................. 10-2018-0039255

(51) Int. Cl.
*H02N 1/04* (2006.01)
(52) U.S. Cl.
CPC ..................... *H02N 1/04* (2013.01)
(58) Field of Classification Search
CPC ................ H02N 1/04; H01G 11/08

USPC ................. 310/300, 308, 309, 310
See application file for complete search history.

(56) References Cited

U.S. PATENT DOCUMENTS

2014/0338458 A1* 11/2014 Wang ............... G01H 11/06
  73/658
2016/0149518 A1* 5/2016 Wang ............... H02N 1/04
  310/310

FOREIGN PATENT DOCUMENTS

JP    2015-502437 A    1/2015
WO   WO2014146501    * 9/2014

OTHER PUBLICATIONS

Song et al., "Integrated Self-Charging Power Unit With Flexible Supercapacitor and Triboelectric Nanogenerator" pp. 14298-14306, Journal of Material Chemistry A, 2016 (Year: 2016).*

(Continued)

*Primary Examiner* — Quyen P Leung
*Assistant Examiner* — Eric Johnson
(74) *Attorney, Agent, or Firm* — NSIP Law

(57) ABSTRACT

Disclosed is an energy generating system having an integrated energy generator and energy storage. According to one embodiment, energy generation and storage may be performed using external kinetic energy, and output from a generator device may be improved using a voltage stored in the energy storage. A storage efficiency of the energy storage may be further increased via the improved output from the generator device. Further, the energy generator and energy storage may be integrated with each other to improve a space utilization.

17 Claims, 11 Drawing Sheets

(56) References Cited

OTHER PUBLICATIONS

Kim et al. "Research Update: Hybrid Energy Devices Combining Nanogenerators and Energy Storage Systems for Self-Charging Capability" APL Materials 5, May 1, 2017 (Year: 2017).*
Hsu et al., Machine Translation of WO2014146501, Sep. 2014 (Year: 2014).*
Zhang, Xiao-Sheng et al., "All-in-one self-powered flexible microsystems based on triboelectric nanogenerators", *Nano Energy 47*, 2018 (pp. 410-426).

* cited by examiner

[Prior Art]

ENERGY GENERATING SYSTEM WITH INTEGRATED ENERGY GENERATOR AND ENERGY STORAGE

CROSS-REFERENCE TO RELATED APPLICATION

This application claims a benefit under 35 U.S.C. § 119 a of Korean Patent Application No. 10-2018-0039255 filed on Apr. 4, 2018, on the Korean Intellectual Property Office, the entire disclosure of which is incorporated herein by reference for all purposes.

BACKGROUND

1. Field

The present disclosure relates to an energy generating system having an integrated energy generator and energy storage.

2. Description of Related Art

Because, conventionally, an energy generation system and an energy storage system are independent of each other, they did not influence on each other. In addition, since they employs separate parts, there is a disadvantage that a volume efficiency of the power generation system and the energy storage system is poor. That is, conventionally, the energy generation system and the energy storage system are separately configured, thereby resulting in inefficient space utilization.

In other words, conventionally, the energy generator and the energy storage define separate individual structures respectively and thus they did not influence on each other. Therefore, the conventional approach has a disadvantage that an installation volume thereof is large.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure aims at enhancing energy generation and storage volume efficiency by integrating energy generation and storage systems, and at improving efficiency of energy generation and storage using synergy between the energy generation system and energy storage system.

In a first aspect of the present disclosure, there is provided an energy generating system having an integrated energy generator and energy storage, wherein the system includes: a first electrode: a first triboelectric layer disposed on the first electrode; a second triboelectric layer disposed on the first triboelectric layer and facing away the first electrode; a second electrode partially disposed on the second triboelectric layer and facing away the first triboelectric layer, wherein a third electrode coplanar with the second electrode, wherein the third electrode partially disposed on the second triboelectric layer, wherein the third electrode is spaced from the second electrode; an energy storage layer disposed on the second electrode and the third electrode and facing away the second triboelectric layer; and a fourth electrode disposed on the energy storage layer and facing away the second electrode and the third electrode, wherein triboelectric ratings of the first and second triboelectric layers are different from each other, wherein a combination of the first triboelectric layer and the second triboelectric layer defines the energy generator, wherein when the first and second triboelectric layers are brought into a contact state and then a noncontact state with each other in a facing and then facing-away manner, triboelectric energy is generated, wherein the generated triboelectric energy is transferred via a rectifier to the third electrode and the fourth electrode and then is stored in the energy storage layer, thereby to generate a potential difference between the third electrode and the fourth electrode, wherein the generated potential difference allows the energy generator to have an increased generated output.

In one implementation of the first aspect, the first electrode and the second electrode are respectively connected to first and second leads, wherein the first and second leads are connected to the rectifier.

In one implementation of the first aspect, the third electrode and the fourth electrode are respectively connected to third and fourth leads, wherein the third and fourth leads are connected to the rectifier.

In one implementation of the first aspect an area occupied by the second electrode is substantially equal to an area occupied by the third electrode.

In one implementation of the first aspect, the first triboelectric layer is made of a metal and functions as the first electrode.

In a second aspect of the present disclosure, there is provided an energy generating system having an integrated energy generator and energy storage, wherein the system includes: a first electrode: a first triboelectric layer disposed on the first electrode; a second triboelectric layer disposed on the first triboelectric layer and facing away the first electrode; a second electrode partially disposed on the second triboelectric layer and facing away the first triboelectric layer, wherein a third electrode coplanar with the second electrode, wherein the third electrode partially disposed on the second triboelectric layer, wherein the third electrode is spaced from the second electrode; an energy storage layer disposed on the second electrode and the third electrode and facing away the second triboelectric layer; and a fourth electrode disposed on the energy storage layer and facing away the second electrode and the third electrode, wherein a second electrode includes a first electrode pattern composed of a first bridge sub-electrode extending in one direction and a plurality of first finger sub-electrodes branched from the first bridge sub-electrode and extending perpendicularly thereto, wherein the third electrode includes a second electrode pattern composed of a second bridge sub-electrode extending in one direction and a plurality of second finger sub-electrodes branched from the second bridge sub-electrode and extending perpendicularly thereto, wherein the first bridge sub-electrode and the second bridge sub-electrode of the third electrode extend to be parallel to each other, wherein the plurality of finger sub-electrodes are interdigitated with the plurality of second finger sub-electrodes, wherein triboelectric ratings of the first and second triboelectric layers are different from each other, wherein a combination of the first triboelectric layer and the second triboelectric layer defines the energy generator, wherein when the first and second triboelectric layers are brought into a contact state and then a noncontact state with each other in a facing and then facing-away manner, triboelectric energy is generated, wherein the generated triboelectric energy is transferred via a rectifier to the third electrode and the fourth electrode and then is stored in the energy storage layer, thereby to generate a potential difference between the third electrode and the fourth electrode, wherein the generated potential difference allows the energy generator to have an increased generated output.

In one implementation of the second aspect, the first electrode and the second electrode are respectively connected to first and second leads, wherein the first and second leads are connected to the rectifier.

In one implementation of the second aspect, the third electrode and the fourth electrode are respectively connected to third and fourth leads, wherein the third and fourth leads are connected to the rectifier.

In one implementation of the second aspect an area occupied by the second electrode is substantially equal to an area occupied by the third electrode.

In one implementation of the second aspect, the first triboelectric layer is made of a metal and functions as the first electrode.

In one implementation of the second aspect an power generation and storage efficiency of the system is proportional to a number of interdigitatings between the first and second finger sub-electrodes.

In a third aspect of the present disclosure, there is provided an energy generating system having an integrated energy generator and energy storage, wherein the system includes: a first electrode: a first triboelectric layer disposed on the first electrode; a second triboelectric layer disposed on the first triboelectric layer and facing away the first electrode; a second electrode partially disposed on the second triboelectric layer and facing away the first triboelectric layer, wherein a third electrode coplanar with the second electrode, wherein the third electrode partially disposed on the second triboelectric layer, wherein the third electrode is spaced from the second electrode; an energy storage layer disposed on the second electrode and the third electrode and facing away the second triboelectric layer; and a fourth electrode disposed on the energy storage layer and facing away the second electrode and the third electrode, wherein each of the second electrode and the third electrode extends to wind around a center in a continuous and diverging manner and in a polygonal or circular shape, wherein the second electrode and the third electrode are alternated with each other, wherein triboelectric ratings of the first and second triboelectric layers are different from each other, wherein a combination of the first triboelectric layer and the second triboelectric layer defines the energy generator, wherein when the first and second triboelectric layers are brought into a contact state and then a noncontact state with each other in a facing and then facing-away manner, triboelectric energy is generated, wherein the generated triboelectric energy is transferred via a rectifier to the third electrode and the fourth electrode and then is stored in the energy storage layer, thereby to generate a potential difference between the third electrode and the fourth electrode, wherein the generated potential difference allows the energy generator to have an increased generated output.

In one implementation of the third aspect, the first electrode and the second electrode are respectively connected to first and second leads, wherein the first and second leads are connected to the rectifier.

In one implementation of the third aspect, the third electrode and the fourth electrode are respectively connected to third and fourth leads, wherein the third and fourth leads are connected to the rectifier.

In one implementation of the third aspect an area occupied by the second electrode is substantially equal to an area occupied by the third electrode.

In one implementation of the third aspect, the first triboelectric layer is made of a metal and functions as the first electrode.

In one implementation of the third aspect an power generation and storage efficiency of the system is proportional to a number of alternations between the second and third electrodes.

According to the present disclosure, a novel system structure may be realized that improves energy generation and storage efficiency using synergy between the energy generation device and energy storage device, which is not the case in the conventional approach. Therefore, an efficiency of the present system having the same devices and the same storage capacity may be higher than the conventional system having the same devices and the same storage capacity.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTIONS

Figure 1:
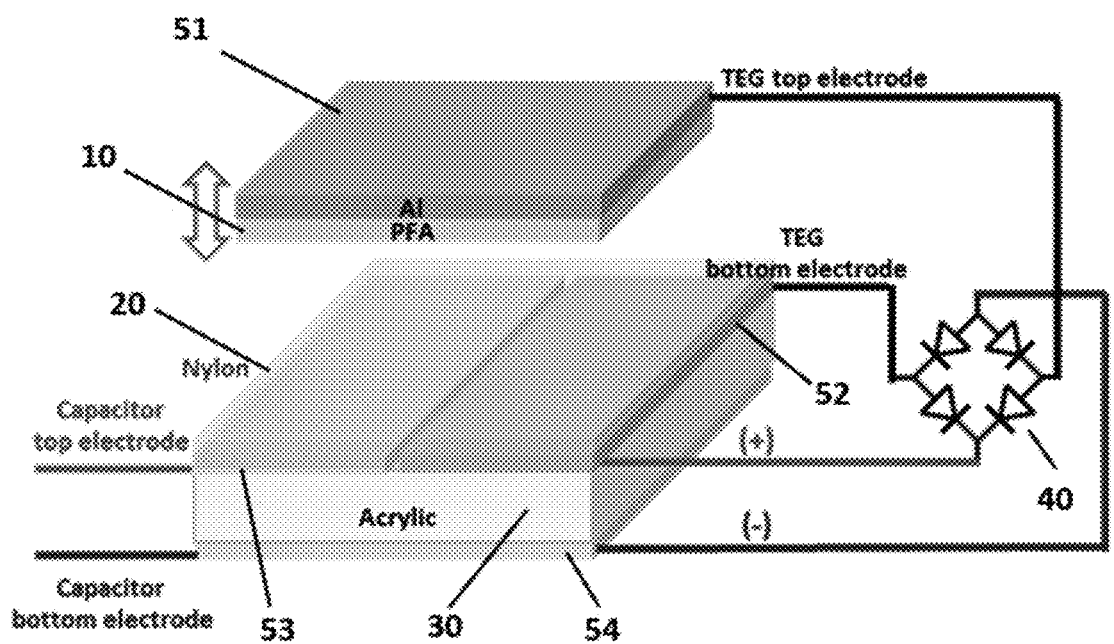
FIG. 1 shows an energy generating system with an integrated energy generator and energy storage according to one embodiment of the present disclosure.

For simplicity and clarity of illustration, elements in the figures, are not necessarily drawn to scale. The same reference numbers in different figures, denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to the present disclosure, energy generation and storage may be performed using external kinetic energy, and generation output of a generator device may be improved using a voltage stored in the energy storage. A storage efficiency of the energy storage may be further increased via the improved generation output of the generator device.

FIG. 1 shows an energy generating system with an integrated energy generator and energy storage according to one embodiment of the present disclosure.

An energy generating system having an integrated energy generator and energy storage according to an embodiment of the present disclosure as shown in FIG. 1 includes a first electrode 51; a first triboelectric layer 10; a second triboelectric layer 20; a second electrode 52; a third electrode 53; an energy storage 30; and a fourth electrode 54.

The first electrode 51 is formed on one face of the first triboelectric layer 10. A material employed for the first electrode may be any material that may be employed as an electrode and may not be limited to any particular material.

The first electrode 51 is placed on one face of the first triboelectric layer 10. The first triboelectric layer 10 faces away the second triboelectric layer 20. They are spaced apart from each other. The first triboelectric layer 10 and the second triboelectric layer 20 may be in contact with each other or in a non-contact state depending on an application of an external force.

The second triboelectric layer 20 faces away the first triboelectric layer 10. The second triboelectric layer is made of a material having a different triboelectric rating from that of the first triboelectric layer. A combination of the first triboelectric layer and the second triboelectric layer define an energy generator. In this case, the greater a difference between a triboelectric rating of the first triboelectric layer and a triboelectric rating of the second triboelectric layer, the greater a frictional electricity or triboelectric effect.

The second electrode 52 is disposed on the second triboelectric layer 20 such that the second triboelectric layer 20 and the first triboelectric layer 10 are interposed between the first and second electrodes. The second electrode 52 is disposed on a partial area of one face of the second triboelectric layer 20. In one example, as shown in FIG. 1, the second electrode 52 is disposed on one 1/2 area of one face of the second triboelectric layer 20. A material employed for the second electrode may be any material that may be employed as an electrode and may not be limited to any particular material.

The third electrode 53 is disposed on the second triboelectric layer 20 such that the second triboelectric layer 20 and the first triboelectric layer 10 are interposed between the first and third electrodes. The third electrode 53 is disposed on a remaining area of one face of the second triboelectric layer 20. In one example, as shown in FIG. 1, the third electrode 53 is disposed on the other 1/2 area of one face of the second triboelectric layer 20. In one example, it is desirable that an area occupied by the second electrode is the same as an area occupied by the third electrode.

A material employed for the third electrode may be any material that may be employed as an electrode and may not be limited to any particular material. Further, the third electrode should be configured to be insulated from the second electrode. For this insulation, there may be a gap between the second electrode and the third electrode, or a non-conductive material (non-conductive adhesive) may be placed between them.

The energy storage 30 serves to store therein the energy generated from the energy generator. The energy storage 30 may employ a high dielectric constant material or a composite material containing the high dielectric constant material. A energy storage capacity of the energy storage 30 depends on a dielectric constant of the dielectric material. In one example, the energy storage is arranged on the second electrode and the third electrode to face away the second triboelectric layer. The fourth electrode 54 is placed on the energy storage 30 such that the energy storage 30 is interposed between a plane defined by the second electrode and the third electrode and a plane defined by the fourth electrode 54.

In this connection, the third and fourth electrodes serve as electrodes for the energy storage. The first and second electrodes serve as electrodes for the energy generator. A material employed for the fourth electrode may be any material that may be employed as an electrode and may not be limited to any particular material.

In the energy generating system with the integrated energy generator and energy storage according to the present disclosure, the first triboelectric layer and the second triboelectric layer may be in a contact state or a noncontact state with each other in a facing or facing-away direction. Thus, the generated triboelectric energy is transferred via a rectifier 40 to the third electrode and the fourth electrode and stored in the energy storage 30, thereby to generate a potential difference between the third electrode and the fourth electrode. Thus, the generated potential difference improves generation output of the energy generator.

In other words, the present disclosure realizes a system that enables energy generation and storage efficiency improvement via synergy between the generated energy and the stored energy in the energy generation and storage system. Further, the energy generator and energy storage may be integrated with each other to improve a space utilization.

In one embodiment, when the storage capacity of the integrated system in accordance with the present disclosure is insufficient, an external storage may be employed.

The first electrode and the second electrode are respectively connected to leads which are connected to the rectifier 40. The third electrode and the fourth electrode are respectively connected to leads which are connected to the rectifier 40.

FIG. 2a to FIG. 2d illustrate an operation principle of the energy generating system having an integrated energy generator and energy storage according to an embodiment of the present disclosure.

Figure 2A:
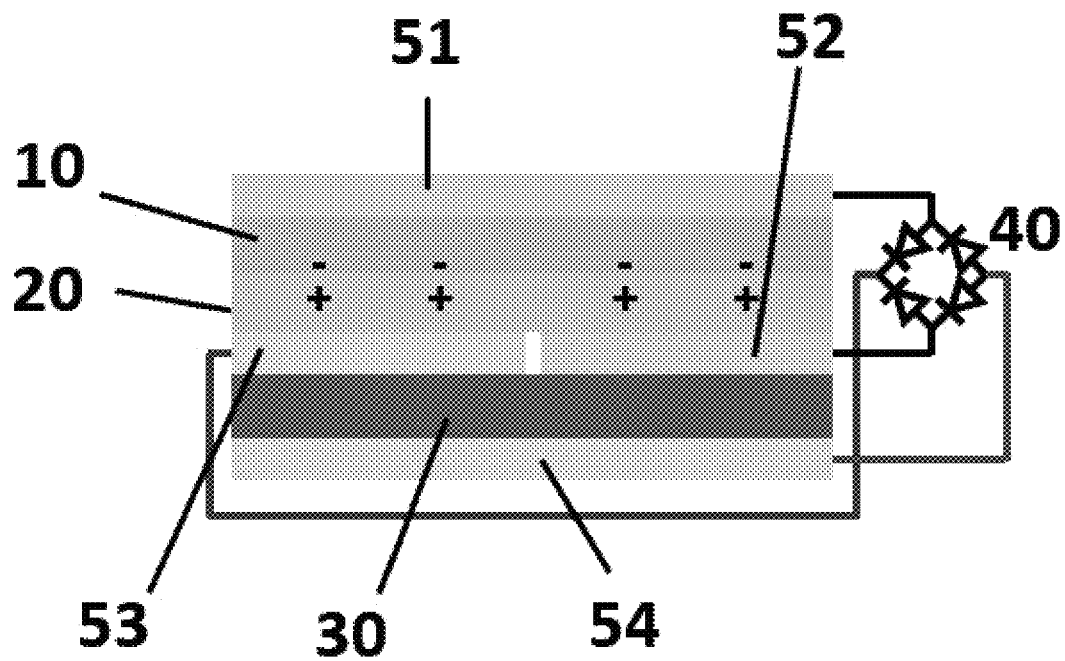
FIG. 2a to FIG. 2d illustrate an operation principle of an energy generating system having the integrated energy generator and energy storage according to an embodiment of the present disclosure.
Figure 2B:
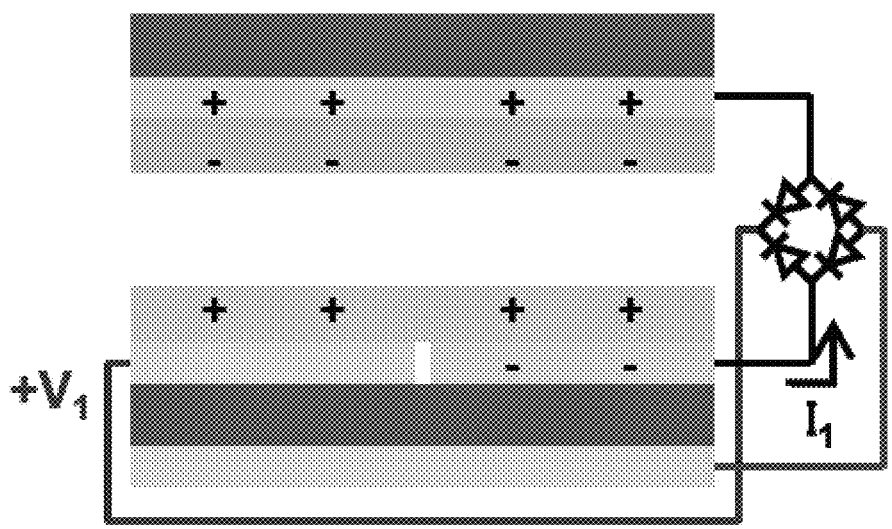
Figure 2C:
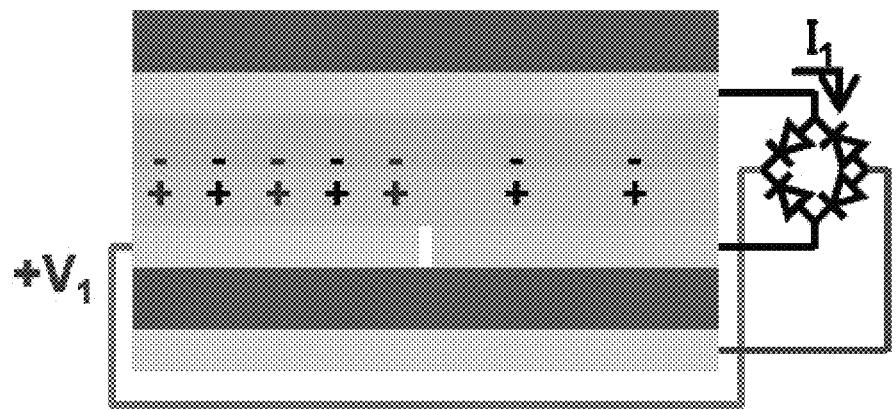
Figure 2D:
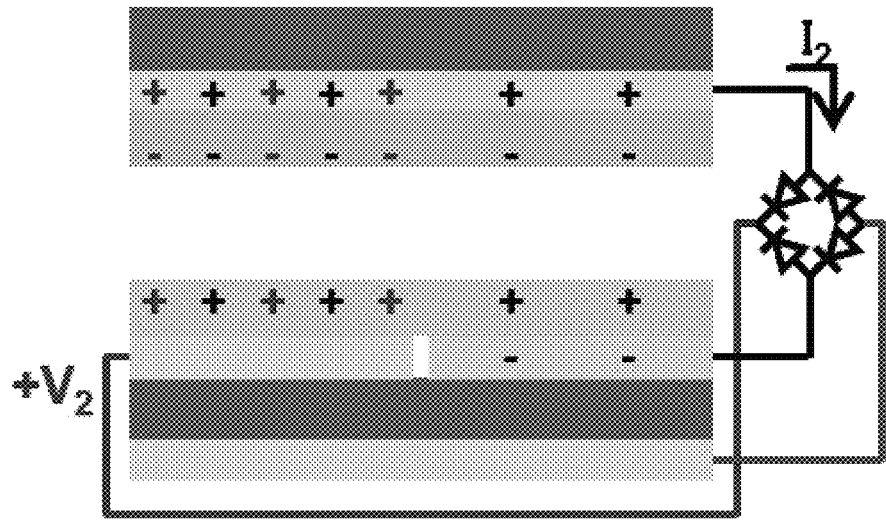

In FIG. 2a, the first triboelectric layer 10 and the second triboelectric layer 20 contact each other to create surface charges thereon. In FIG. 2b, the first triboelectric layer and the second triboelectric layer are separated from each other. Thus, a triboelectric output is generated via the rectifier. The resulting triboelectric output is rectified and enters the third electrode 53 as an upper electrode of a capacitor. Therefore, the third electrode 53 as the upper electrode of the capacitor is positively biased. In FIG. 2c, the positive bias across the upper electrode of the capacitor enables the second triboelectric layer 20 to be more positively biased. This results in an increase in the surface charges on the second triboelectric layer and thus an increase in the triboelectric output. In FIG. 2d, the increase in the triboelectric output allows the potential difference in the capacitor to increase. As a result, in accordance with the present disclosure, the synergistic effect between the triboelectric generation device and the capacitor may be obtained.

Figure 3:
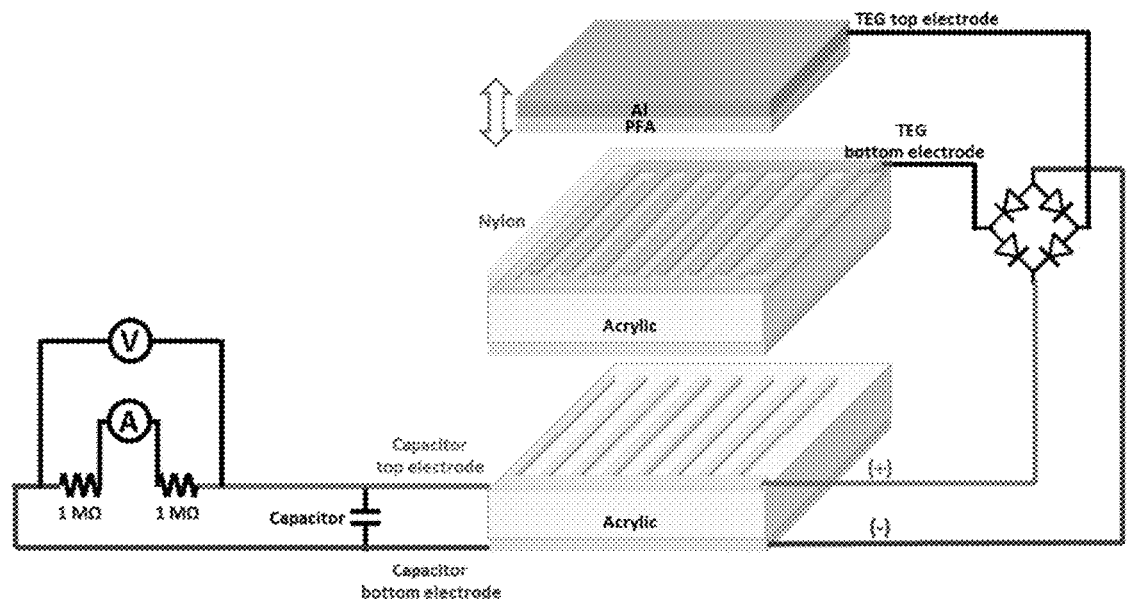
FIG. 3 shows a schematic diagram of a device according to a prior art for comparison.
Figure 4:
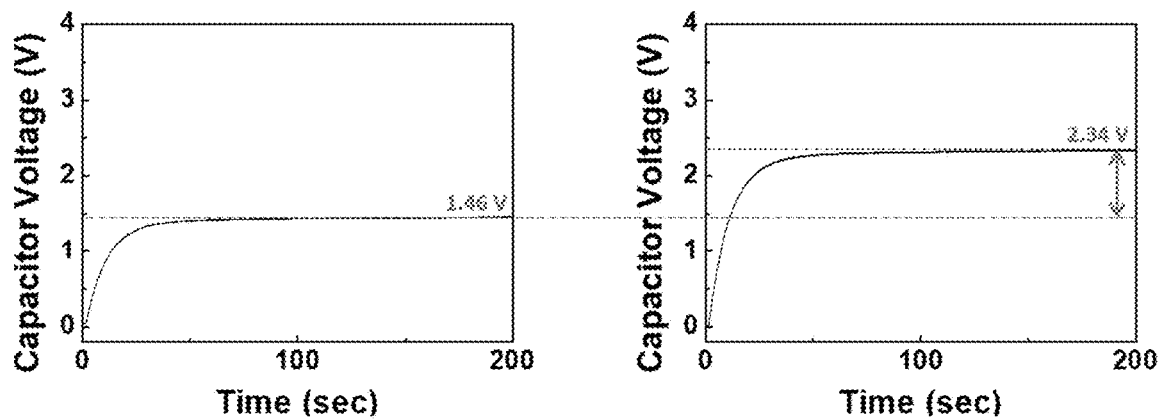
FIG. 4 shows capacitor voltage outputs for the device according to the prior art and the device according to the present disclosure, respectively.
Figure 5:
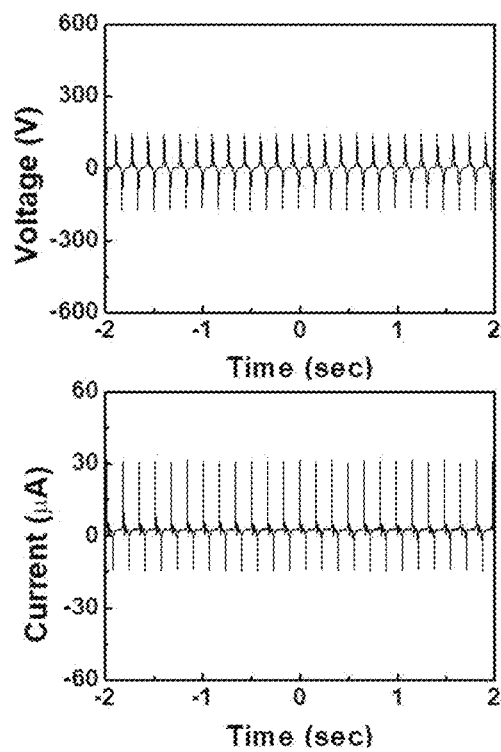
FIG. 5 shows voltage and current values for the device according to the prior art and the device according to the present disclosure, respectively.
Figure 5:
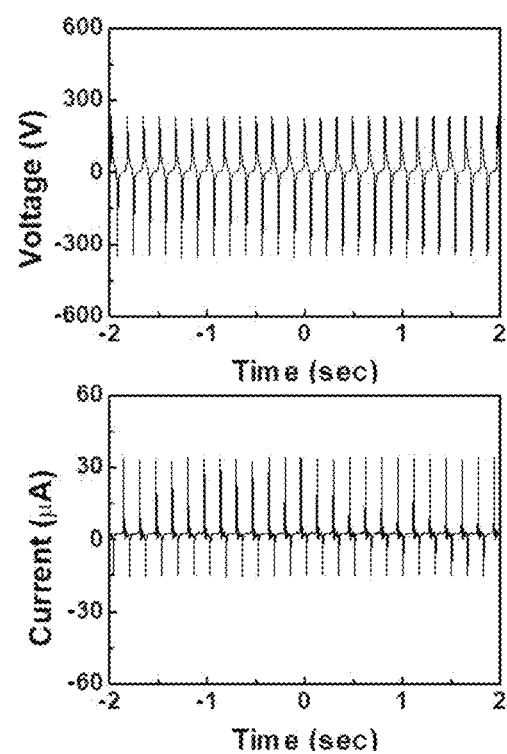

In an embodiment of FIG. 1, the first electrode is made of Al, PFA is used for the first triboelectric layer, and Nylon was used for the second triboelectric layer. However, the present disclosure is not limited thereto. In order to compare the present device in accordance with an embodiment of FIG. 1 with a prior art device, the prior art device having the first electrode made of Al, the first triboelectric layer made of PFA, and the second triboelectric layer made of Nylon and a separate energy storage is manufactured. In this connection, the prior art device is not the integrated device, but a non-integrated device in which an energy generator and an energy storage are separately constructed and do not affect each other. Then, we compare the triboelectric powers therebetween. Comparison results are shown in FIG. 4 and FIG. 5. FIG. 3 shows a schematic diagram of the device according to the prior art for comparison. FIG. 4 shows capacitor voltage output values for the device according to the prior art and the device according to the present disclosure, respectively. FIG. 5 shows voltage and current values for the device according to the prior art and the device according to the present disclosure, respectively.

In each of FIG. 4 and FIG. 5, a left side indicates a graph for the device according to the prior art, while a right side indicates a graph about the device according to the present disclosure. As shown in FIG. 4 and FIG. 5, the integrated device between energy generation and energy storage in accordance with the present disclosure exhibits an improvement in the energy storage efficiency of about 20% compared to the prior art device. The similar effect is observed in both of a high charging voltage region and a low charging voltage region.

In one embodiment, in an energy generating system having an integrated energy generator and energy storage according to a further embodiment of the present disclosure as shown in FIG. 1, the first electrode is not disposed on the first triboelectric layer, but the first triboelectric layer itself is made of metal and serves as the first electrode. In this case, a conductive metal material is used as the first triboelectric layer serving as the first electrode. Examples of the metal may include lead, aluminum, iron, copper, silver, gold, platinum and the like.

Figure 6:
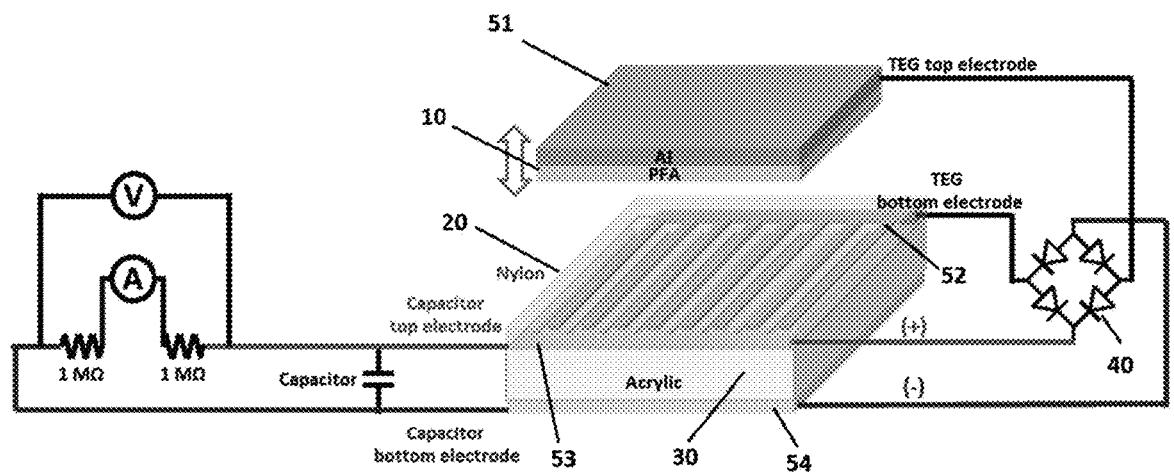
FIG. 6 shows an energy generating system with an integrated energy generator and energy storage according to a further embodiment of the present disclosure.

FIG. 6 illustrates an energy generating system with an integrated energy generator and energy storage according to a further embodiment of the present disclosure. The embodiment of FIG. 6 is substantially the same as the embodiment of FIG. 1, except for a shape and arrangement of the second electrode and the third electrode. Hereinafter, descriptions of the same elements as those described above will be omitted. Descriptions will focus on different parts therebetween.

An energy generating system having an integrated energy generator and energy storage according to a further embodiment of the present disclosure includes a first triboelectric layer 10; a first electrode 51 disposed on one face of the first triboelectric layer 10; a second triboelectric layer 20 facing the first triboelectric layer; a second electrode 52 disposed on the second triboelectric layer such that the first triboelectric layer and the second triboelectric layer are interposed between the first and second electrodes; a third electrode 53 coplanar with the second electrode, wherein the second and third electrodes are spaced from each other and occupies respective halves of the common plane; an energy storage 30 disposed on the second electrode and third electrode and facing away the second triboelectric layer 20; and a fourth electrode 54 disposed on the energy storage 30 and facing away the second electrode and third electrode.

In this case, each of the second electrode 52 and the third electrode 53 may be embodied as an electrode pattern composed of a bridge sub-electrode extending in one direction and a plurality of finger sub-electrodes branched from the bridge sub-electrode and extending perpendicularly thereto.

Figure 7:
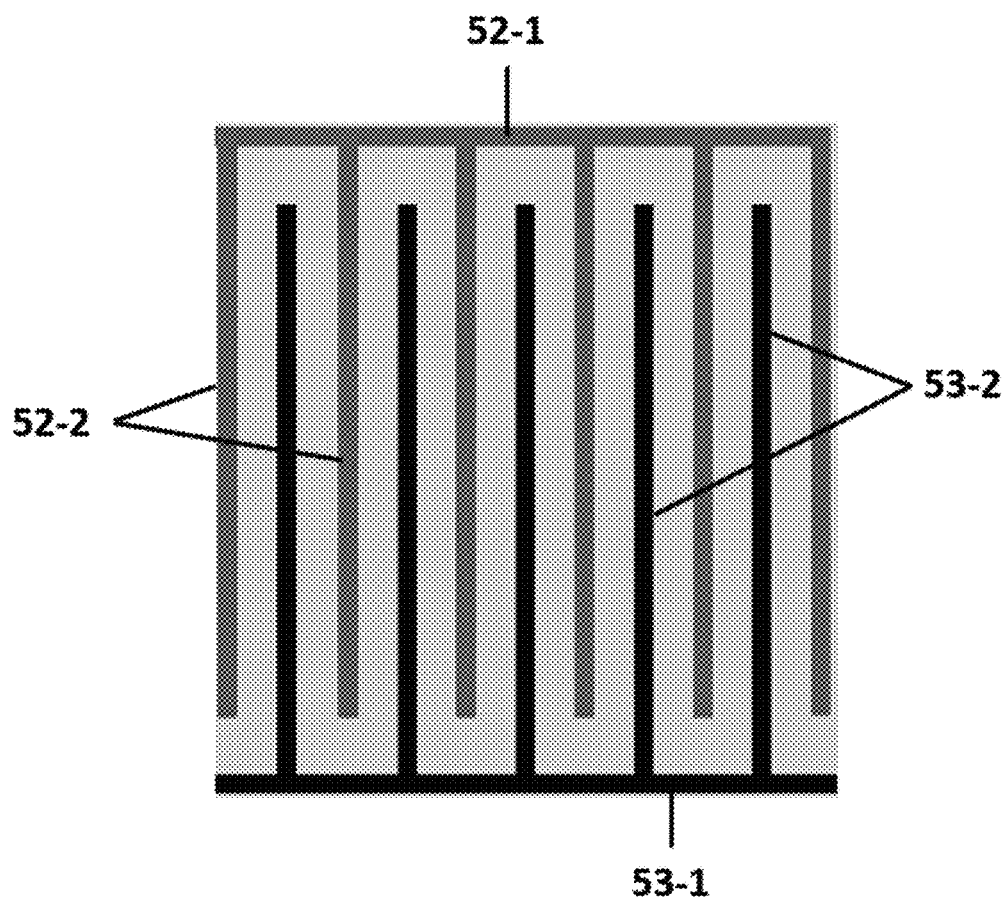
FIG. 7 shows a top view of an arrangement of a second electrode and a third electrode in a system according to a further embodiment of the present disclosure.

FIG. 7 shows a top view of an arrangement of the second electrode and the third electrode in a system according to a further embodiment of the present disclosure. As shown in FIG. 7, the second electrode 52 in a plan view may be embodied as an electrode pattern composed of a bridge sub-electrode 52-1 extending in one direction and a plurality of finger sub-electrodes 52-2 branched from this bridge sub-electrode and extending perpendicularly thereto. The third electrode 53 is composed of a bridge sub-electrode 53-1 extending in one direction and a plurality of finger sub-electrodes 53-2 branched from the bridge sub-electrode and extending perpendicularly thereto. The bridge sub-electrode 52-1 of the second electrode and the bridge sub-electrode 53-1 of the third electrode are parallel to each other. The plurality of finger sub-electrodes 52-2 of the second electrode and a plurality of finger sub-electrodes 53-2 of the third electrode are interdigitated with each other. In this case, the second electrode and the third electrode are insulated from each other. In FIG. 7, the space between the second electrode and the third electrode is shown to be very large. However, actually, the spacing is very small.

In one example, it is desirable that the area occupied by the second electrode is the same as the area occupied by the third electrode. As the number of the finger sub-electrodes of the second electrode and the number of the finger sub-electrodes of the third electrode increases and a width of each finger sub-electrode is smaller, the generated power output amount may increase.

A triboelectric rating of the material of the second triboelectric layer is different from that of the first triboelectric layer. A combination of the first triboelectric layer and the second triboelectric layer defines an energy generator.

In the energy generating system having the integrated energy generator and energy storage according to the further embodiment of the present disclosure, the first triboelectric layer and the second triboelectric layer may be in a contact state or a noncontact state with each other in a facing or facing-away direction. Thus, the generated triboelectric energy is transferred via a rectifier 40 to the third electrode and the fourth electrode and stored in the energy storage 30, thereby to generate a potential difference between the third electrode and the fourth electrode. Thus, the generated potential difference improves generation output of the energy generator.

The first electrode and the second electrode are respectively connected to leads which are connected to the rectifier 40. The third electrode and the fourth electrode are respectively connected to leads which are connected to the rectifier 40.

In one example, in the energy generating system having the integrated energy generator and energy storage according to the further embodiment of the present disclosure as shown in FIG. 6, the first electrode is not disposed on the first triboelectric layer, but the first triboelectric layer itself is made of metal and serves as the first electrode. In this case, a conductive metal material is used as the first triboelectric layer serving as the first electrode. Examples of the metal may include lead, aluminum, iron, copper, silver, gold, platinum and the like.

Figure 8:
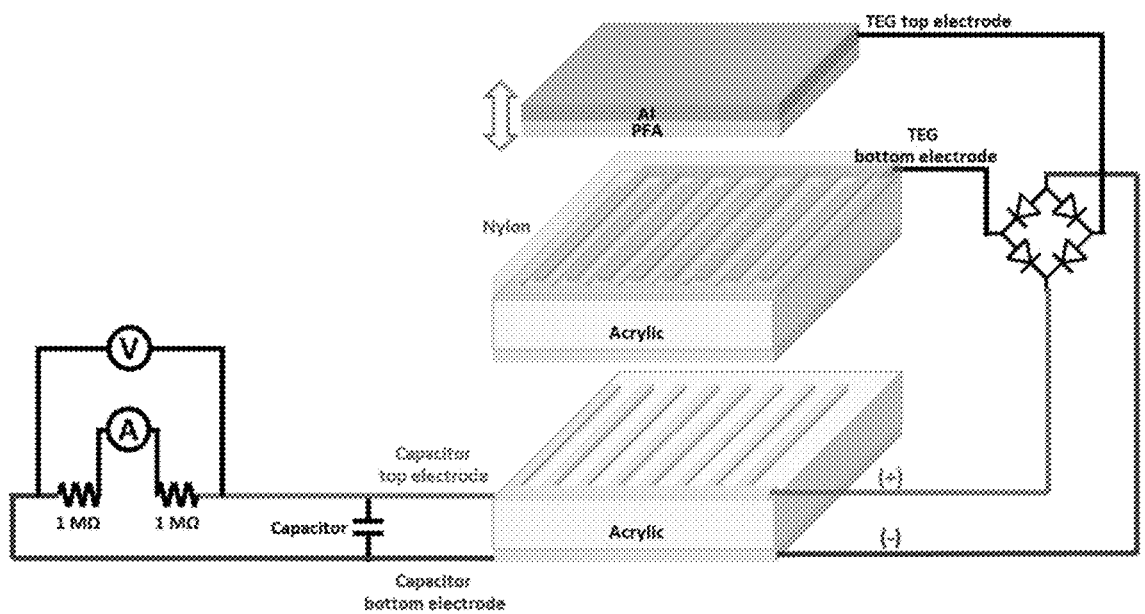
FIG. 8 shows a schematic diagram of a device according to a prior art for comparison.
Figure 9:
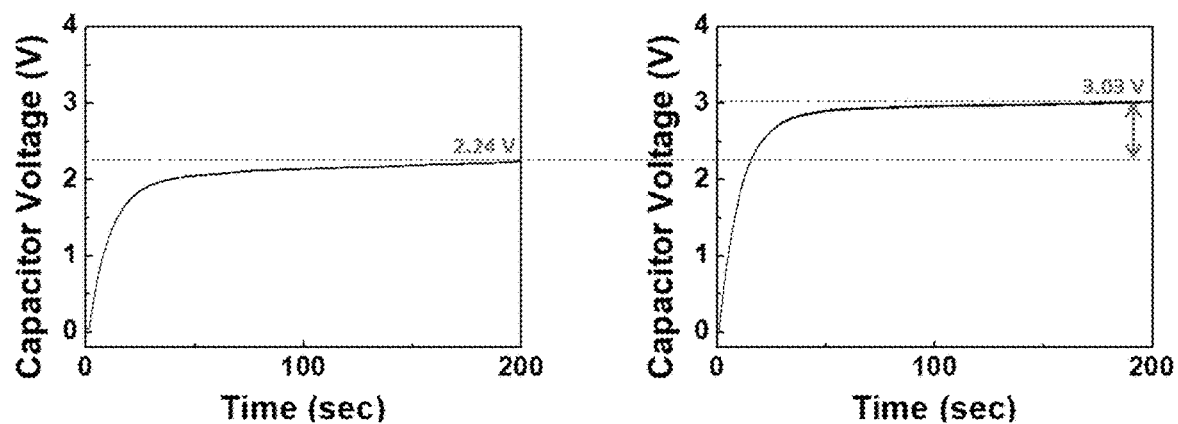
FIG. 9 shows capacitor voltage output values for the device according to the prior art and the device according to the present disclosure, respectively.
Figure 10:
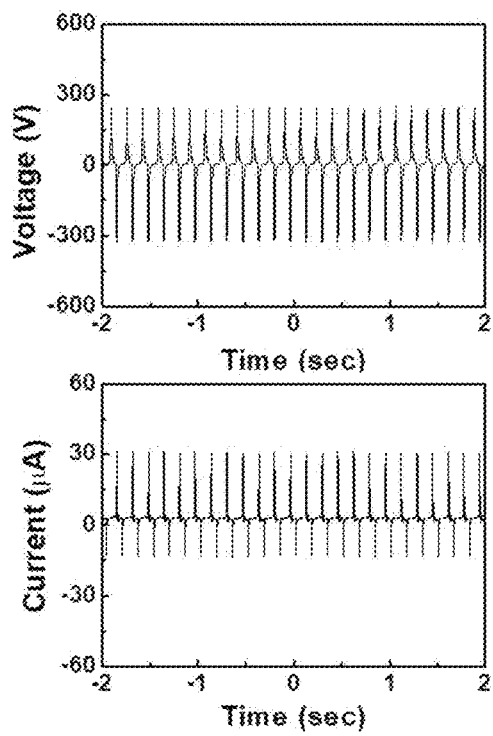
FIG. 10 shows voltage and current values for the device according to the prior art and the device according to the present disclosure, respectively.
Figure 10:
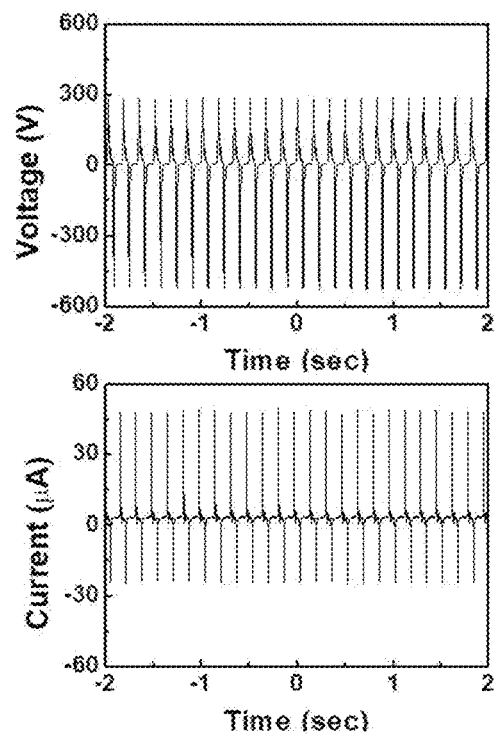

FIG. 8 shows a schematic diagram of a device according to a prior art for comparison. FIG. 9 shows capacitor voltage output values for the device according to the prior art and the device according to the present disclosure, respectively. FIG. 10 shows voltage and current values for the device according to the prior art and the device according to the present disclosure, respectively.

In each of FIG. 9 and FIG. 10, a left side indicates a graph for the device according to the prior art, while a right side indicates a graph about the device according to the present disclosure. As shown in FIG. 9 and FIG. 10, the integrated device between energy generation and energy storage in accordance with the present disclosure exhibits an improvement in the energy storage efficiency of about 20% compared to the prior art device. The similar effect is observed in both of a high charging voltage region and a low charging voltage region.

Further, the device of the embodiment of FIG. 6 achieves an efficiency improvement of about 40% or greater as compared to the device of the embodiment of FIG. 1. As a result, the energy generation and storage efficiency in the present device, that is, in the integrated energy generation and storage system is improved by about 20% as compared to that of the prior art device, that is, in the non-integrated energy generation and storage system. Further, it may be confirmed that it is necessary to configure the electrodes of the energy storage and the energy generator in consideration of the finding that a variation in the electrode configuration may lead to a variation in the energy storage and generation efficiency. In other words, it is confirmed that the efficiency difference between the electrode configurations of the embodiment of FIG. 1 and the embodiment of FIG. 6 is greater than or equal to 40%. Further, regarding the electrode configuration of the embodiment of FIG. 6, as the number of the finger sub-electrodes of the second electrode and the number of the finger sub-electrodes of the third electrode increases and a width of each finger sub-electrode is smaller, the generated power output amount may increase.

Figure 11:
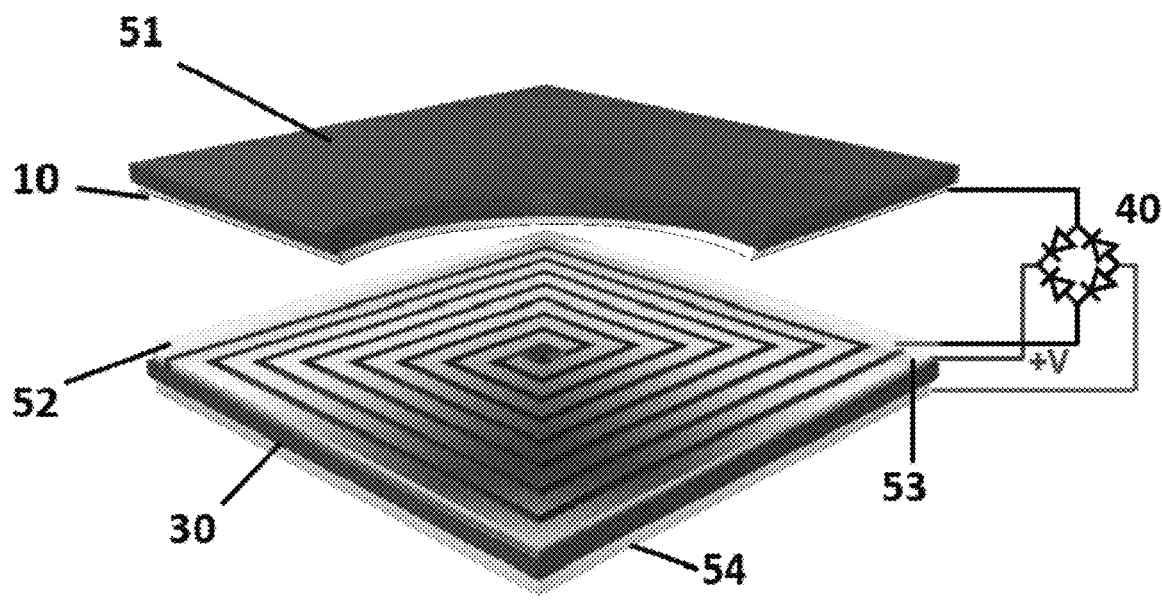
FIG. 11 shows an energy generating system with an integrated energy generator and energy storage according to still another embodiment of the present disclosure.

FIG. 11 illustrates an energy generating system with an integrated energy generator and energy storage according to a still further embodiment of the present disclosure. The embodiment of FIG. 11 is substantially the same as the embodiment of FIG. 6, except for a shape and arrangement of the second electrode and the third electrode. Hereinafter, descriptions of the same elements as those described above will be omitted. Descriptions will focus on different parts therebetween.

As shown in FIG. 11, each of the second electrode 52 of the triboelectric device and the third electrode 53 as the upper electrode of the capacitor as the energy storage 30 extends to wind around a center in a rectangular manner and in a diverging manner. In this case, the second electrode and the third electrode are alternated with each other. In another example, the rectangular manner may be varied to any polygonal manner.

Figure 12:
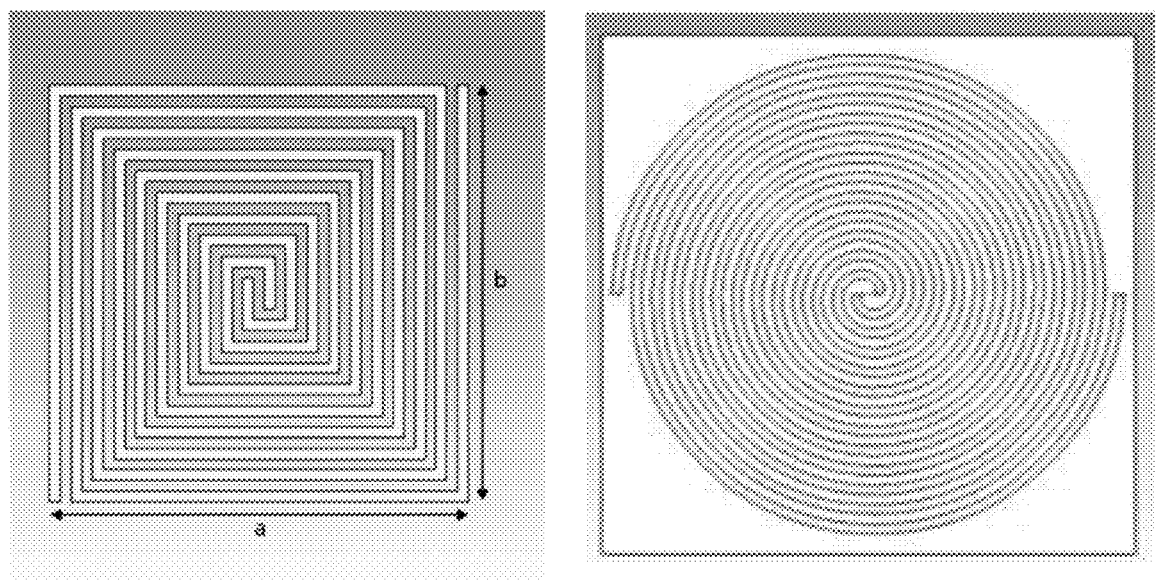
FIG. 12 shows a top view of an arrangement of a second electrode and a third electrode in a system according to the still another embodiment of the present disclosure.

In one example, as shown in a right side of FIG. 12, each of the second electrode 52 of the triboelectric device and the third electrode 53 as the upper electrode of the capacitor as the energy storage 30 extends to wind around a center in a circular manner and in a diverging manner. In other words, each of the second electrode 52 of the triboelectric device and the third electrode 53 as the upper electrode of the capacitor as the energy storage 30 extends in a spiral manner. In this case, the second electrode and the third electrode are alternated with each other. In the spiral manner, the generation and storage efficiency may be the highest.

FIG. 12 shows a top view of arrangements of the second electrode and the third electrode in the system according to a still further embodiment of the present disclosure. FIG. 12 shows a top view of rectangular and circular electrode patterns. In the left side of FIG. 12, each of the second electrode of the triboelectric device and the third electrode as the upper electrode of the capacitor as the energy storage extends to wind around a center in a rectangular manner and in a diverging manner. In this case, the second electrode and the third electrode are alternated with each other. In another example, the rectangular manner may be varied to any polygonal manner. In the right side of FIG. 12, each of the second electrode of the triboelectric device and the third electrode 53 as the upper electrode of the capacitor as the energy storage 30 extends to wind around a center in a circular manner and in a diverging manner. In other words, each of the second electrode of the triboelectric device and the third electrode as the upper electrode of the capacitor as the energy storage extends in a spiral manner. In this case, the second electrode and the third electrode are alternated with each other.

In one example, in the energy generating system having the integrated energy generator and energy storage according to the still further embodiment of the present disclosure as shown in FIG. 11, the first electrode is not disposed on the first triboelectric layer, but the first triboelectric layer itself is made of metal and serves as the first electrode. In this case, a conductive metal material is used as the first triboelectric layer serving as the first electrode. Examples of the metal may include lead, aluminum, iron, copper, silver, gold, platinum and the like.

Figure 13:
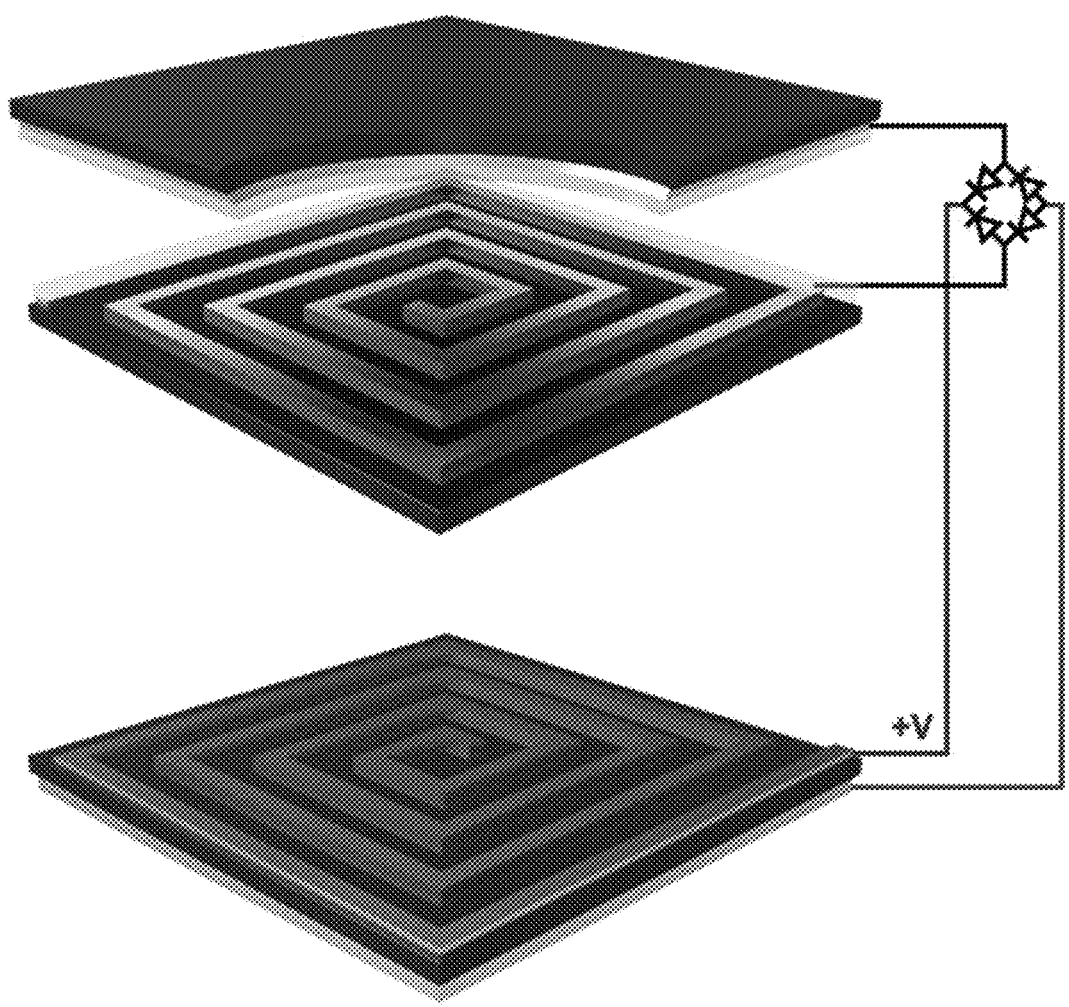
FIG. 13 shows a schematic diagram of a device according to a prior art for comparison.
Figure 14:
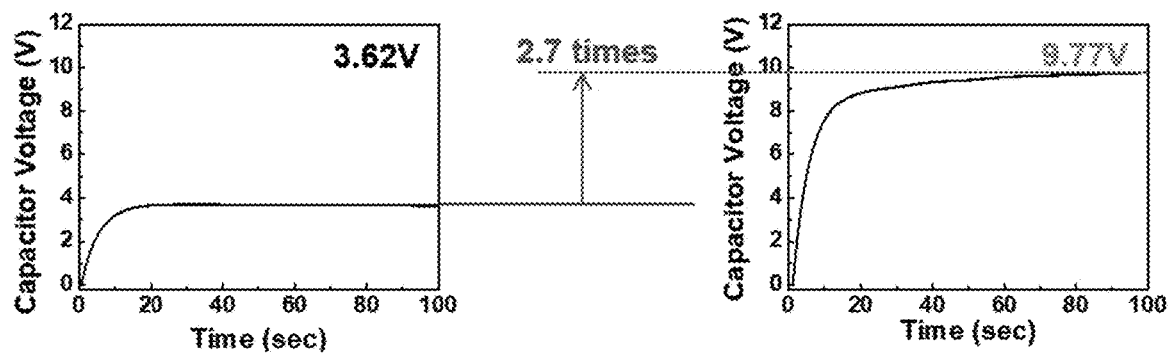
FIG. 14 shows capacitor voltage outputs for the device according to the prior art and the device according to the present disclosure, respectively.

FIG. 13 shows a schematic diagram of a device according to a prior art for comparison. FIG. 14 shows capacitor voltage output values for the device according to the prior art and the device according to the present disclosure, respectively.

In FIG. 14, a left side indicates a graph for the device according to the prior art, while a right side indicates a graph about the device according to the present disclosure. As shown in FIG. 14, the integrated device between energy generation and energy storage in accordance with the present disclosure exhibits the capacitor voltage output value which is about three times larger than that of the prior art device.

Further, Further, it may be confirmed that it is necessary to configure the electrodes of the energy storage and the energy generator in consideration of the finding that a variation in the electrode configuration may lead to a variation in the energy storage and generation efficiency. Thus, regarding the electrode configuration of the embodiment of FIG. 12, as the number of the alternated repetitions between the electrode for the generator, that is, as the second electrode and the electrode for the capacitor as the energy storage, that is, the third electrode increases, the generated and stored power output amount may increase.

Figure 15:
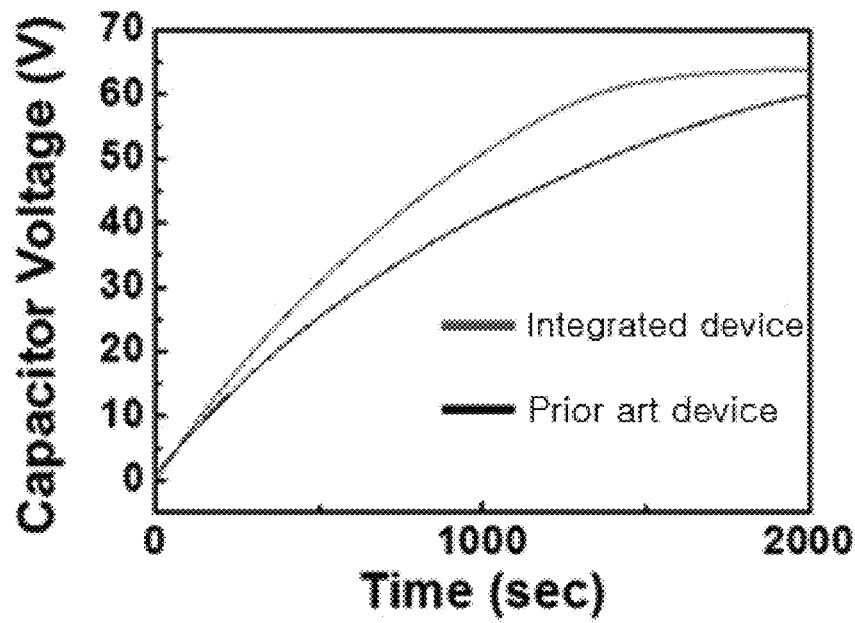
FIG. 15 is a graph comparing energy storage efficiencies between the device according to the prior art and the device according to an embodiment of the present disclosure.

FIG. 15 is a graph comparing energy storage efficiencies between the device according to the prior art and the device according to an embodiment of the present disclosure. As shown in FIG. 15, the integrated device between energy generation and energy storage in accordance with the present disclosure exhibits an improvement in the energy storage efficiency of about 20% compared to the prior art device.

According to the present disclosure, a novel system structure may be realized that improves energy generation and storage efficiency using synergy between the energy generation device and energy storage device, which is not the case in the conventional approach. Therefore, an efficiency of the present system having the same devices and the same storage capacity may be higher than the conventional system having the same devices and the same storage capacity.

According to the present disclosure, the energy is generated and stored using an external kinetic energy. Then, the output from the energy generator may be improved due to the voltage stored in the energy storage. Then, the improved output of the energy generator may allow the storage efficiency of the energy storage to be further increased. This synergy effect between the generator and storage may be realized in a virtuous circle manner The description of the disclosed embodiments is provided to enable any person skilled in the art to make or use the present disclosure. Various modifications to these embodiments will be readily apparent to those skilled in the art of the present disclosure. The generic principles defined herein may be applied to other embodiments without departing from the scope of the present disclosure. Thus, the present disclosure is not to be construed as limited to the embodiments set forth herein, but is to be accorded the widest scope consistent with the principles and novel features set forth herein.

What is claimed is:

1. An energy generating system having an integrated energy generator and energy storage, wherein the system includes:
    a first electrode:
    a first triboelectric layer, where the first electrode is disposed on one face of the first triboelectric layer;
    a second triboelectric layer facing the first triboelectric layer and being spaced from the first triboelectric layer;
    a second electrode disposed on a partial area of one face of the second triboelectric layer facing away from the first triboelectric layer;
    a third electrode coplanar with the second electrode, wherein the third electrode disposed on another partial area of the one face of the second triboelectric layer, wherein the third electrode is spaced from the second electrode;
    an energy storage layer disposed on the second electrode and the third electrode and facing the second triboelectric layer while being spaced from the second triboelectric layer; and
    a fourth electrode disposed on the energy storage layer and facing the second electrode and the third electrode while being spaced from the second electrode and the third electrode,
    wherein triboelectric ratings of the first and second triboelectric layers are different from each other, wherein a combination of the first triboelectric layer and the second triboelectric layer defines the energy generator,
    wherein when the first and second triboelectric layers are brought into a contact state and then a noncontact state with each other, triboelectric energy is generated,
    wherein the generated triboelectric energy is transferred via a rectifier to the third electrode and the fourth electrode and then is stored in the energy storage layer, thereby to generate a potential difference between the third electrode and the fourth electrode,
    wherein the generated potential difference allows the energy generator to have an increased generated output.

2. The energy generating system of claim 1, wherein the first electrode and the second electrode are respectively connected to first and second leads, wherein the first and second leads are connected to the rectifier.

3. The energy generating system of claim 2, wherein the third electrode and the fourth electrode are respectively connected to third and fourth leads, wherein the third and fourth leads are connected to the rectifier.

4. The energy generating system of claim 1, wherein an area occupied by the second electrode is substantially equal to an area occupied by the third electrode.

5. The energy generating system of claim 1, wherein the first triboelectric layer is made of a metal and functions as the first electrode.

6. An energy generating system having an integrated energy generator and energy storage, wherein the system includes:
   a first electrode:
   a first triboelectric layer, where the first electrode is disposed on one face of the first triboelectric layer;
   a second triboelectric layer facing the first triboelectric layer and being spaced from the first triboelectric layer;
   a second electrode disposed on a partial area of one face of the second triboelectric layer facing away from the first triboelectric layer;
   a third electrode coplanar with the second electrode, wherein the third electrode disposed on another partial area of the one face of the second triboelectric layer, wherein the third electrode is spaced from the second electrode;
   an energy storage layer disposed on the second electrode and the third electrode and facing the second triboelectric layer while being spaced from the second triboelectric layer; and
   a fourth electrode disposed on the energy storage layer and facing the second electrode and the third electrode while being spaced from the second electrode and the third electrode,
   wherein the second electrode includes a first electrode pattern composed of a first bridge sub-electrode extending in one direction and a plurality of first finger sub-electrodes branched from the first bridge sub-electrode and extending perpendicularly thereto,
   wherein the third electrode includes a second electrode pattern composed of a second bridge sub-electrode extending in one direction and a plurality of second finger sub-electrodes branched from the second bridge sub-electrode and extending perpendicularly thereto,
   wherein the first bridge sub-electrode and the second bridge sub-electrode of the third electrode extend to be parallel to each other,
   wherein the plurality of first finger sub-electrodes are interdigitated with the plurality of second finger sub-electrodes,
   wherein triboelectric ratings of the first and second triboelectric layers are different from each other, wherein a combination of the first triboelectric layer and the second triboelectric layer defines the energy generator,
   wherein when the first and second triboelectric layers are brought into a contact state and then a noncontact state with each other, triboelectric energy is generated,
   wherein the generated triboelectric energy is transferred via a rectifier to the third electrode and the fourth electrode and then is stored in the energy storage layer, thereby to generate a potential difference between the third electrode and the fourth electrode,
   wherein the generated potential difference allows the energy generator to have an increased generated output.

7. The energy generating system of claim 6, wherein the first electrode and the second electrode are respectively connected to first and second leads, wherein the first and second leads are connected to the rectifier.

8. The energy generating system of claim 7, wherein the third electrode and the fourth electrode are respectively connected to third and fourth leads, wherein the third and fourth leads are connected to the rectifier.

9. The energy generating system of claim 6, wherein an area occupied by the second electrode is substantially equal to an area occupied by the third electrode.

10. The energy generating system of claim 6, wherein the first triboelectric layer is made of a metal and functions as the first electrode.

11. The energy generating system of claim 6, wherein a power generation and storage efficiency of the system is proportional to a number of interdigitatings between the first and second finger sub-electrodes.

12. An energy generating system having an integrated energy generator and energy storage, wherein the system includes:
   a first electrode:
   a first triboelectric layer, where the first electrode is disposed on one face of the first triboelectric layer;
   a second triboelectric layer facing the first triboelectric layer and being spaced from the first triboelectric layer;
   a second electrode disposed on a partial area of one face of the second triboelectric layer facing away from the first triboelectric layer;
   a third electrode coplanar with the second electrode, wherein the third electrode disposed on another partial area of the one face of the second triboelectric layer, wherein the third electrode is spaced from the second electrode;
   an energy storage layer disposed on the second electrode and the third electrode and facing the second triboelectric layer while being spaced from the second triboelectric layer; and
   a fourth electrode disposed on the energy storage layer and facing the second electrode and the third electrode while being spaced from the second electrode and the third electrode,
   wherein each of the second electrode and the third electrode extends to wind around a center in a continuous and diverging manner and in a polygonal or circular shape, wherein the second electrode and the third electrode are alternated with each other,
   wherein triboelectric ratings of the first and second triboelectric layers are different from each other, wherein a combination of the first triboelectric layer and the second triboelectric layer defines the energy generator,
   wherein when the first and second triboelectric layers are brought into a contact state and then a noncontact state with each other, triboelectric energy is generated,
   wherein the generated triboelectric energy is transferred via a rectifier to the third electrode and the fourth electrode and then is stored in the energy storage layer, thereby to generate a potential difference between the third electrode and the fourth electrode,
   wherein the generated potential difference allows the energy generator to have an increased generated output.

13. The energy generating system of claim 12, wherein the first electrode and the second electrode are respectively connected to first and second leads, wherein the first and second leads are connected to the rectifier.

14. The energy generating system of claim 13, wherein the third electrode and the fourth electrode are respectively connected to third and fourth leads, wherein the third and fourth leads are connected to the rectifier.

15. The energy generating system of claim 12, wherein an area occupied by the second electrode is substantially equal to an area occupied by the third electrode.

16. The energy generating system of claim 12, wherein the first triboelectric layer is made of a metal and functions as the first electrode.

17. The energy generating system of claim 12, wherein a power generation and storage efficiency of the system is proportional to a number of alternations between the second and third electrodes.

* * * * *